(12) United States Patent
Yang et al.

(10) Patent No.: US 12,500,424 B2
(45) Date of Patent: Dec. 16, 2025

(54) POWER SUPPLY SYSTEM AND SOLAR PHOTOVOLTAIC INVERTER

(71) Applicant: ALTENERGY POWER SYSTEM INC., Zhejiang (CN)

(72) Inventors: Yongchun Yang, Zhejiang (CN); Guoyong Hua, Zhejiang (CN); Biaojie Qi, Zhejiang (CN); Yuhao Luo, Zhejiang (CN)

(73) Assignee: ALTENERGY POWER SYSTEM INC., Zhejiang (CN)

( * ) Notice: Subject to any disclaimer, the term of this patent is extended or adjusted under 35 U.S.C. 154(b) by 222 days.

(21) Appl. No.: 18/265,946

(22) PCT Filed: Dec. 7, 2021

(86) PCT No.: PCT/CN2021/136053
§ 371 (c)(1),
(2) Date: Jun. 7, 2023

(87) PCT Pub. No.: WO2022/121890
PCT Pub. Date: Jun. 16, 2022

(65) Prior Publication Data
US 2024/0039289 A1 Feb. 1, 2024

(30) Foreign Application Priority Data
Dec. 7, 2020 (CN) .......................... 202011419207.4

(51) Int. Cl.
*H02J 3/38* (2006.01)
*H02J 3/46* (2006.01)
(Continued)

(52) U.S. Cl.
CPC ................ *H02J 3/381* (2013.01); *H02J 3/46* (2013.01); *H02M 7/04* (2013.01); *H02M 7/48* (2013.01); *H02J 2300/24* (2020.01)

(58) Field of Classification Search
CPC .......... H02J 3/38; H02J 3/381; H02J 2300/00; H02J 2300/20; H02J 2300/22;
(Continued)

(56) References Cited

U.S. PATENT DOCUMENTS

| 5,982,642 A | 11/1999 | Herfurth |
| 2014/0361759 A1 | 12/2014 | Lei et al. |

(Continued)

FOREIGN PATENT DOCUMENTS

| CN | 102215012 A | 10/2011 |
| CN | 102684284 A | 9/2012 |

(Continued)

OTHER PUBLICATIONS

English translation CN107508484. (Year: 2017).*
(Continued)

*Primary Examiner* — Thienvu V Tran
*Assistant Examiner* — Carlos O Rivera-Perez
(74) *Attorney, Agent, or Firm* — Yue (Robert) Xu; Apex Attorneys at Law, LLP

(57) ABSTRACT

A power supply system and a solar photovoltaic inverter, DC/DC module and a rectification module. Since a power supply outputted from a solar panel is low-voltage power, the power supply at an output end of the solar panel can be directly supplied to a DC driving module and a DC side circuit. Since a power supply outputted from a main transformer is high-voltage power, the AC outputted from the main transformer can be directly supplied to an inverter driving module, a rectification driving module, and an AC side circuit, without additionally providing an auxiliary power supply for high-voltage isolation, namely, without additionally providing a switching circuit, a transformer, a second rectifier module, and a third rectifier module, thereby avoiding the noise and power consumption caused by fre-
(Continued)

quent ON or OFF of the switching circuit, and reducing the cost.

17 Claims, 7 Drawing Sheets

(51) Int. Cl.
*H02M 7/04* (2006.01)
*H02M 7/48* (2007.01)

(58) Field of Classification Search
CPC ...... H02J 2300/24; H02J 2300/26; H02J 3/46; H02M 7/00; H02M 7/02; H02M 7/04; H02M 7/05; H02M 7/155; H02M 7/162; H02M 7/1623; H02M 7/1626; H02M 7/42; H02M 7/44; H02M 7/48; H02M 7/483; H02M 7/521; H02M 7/53; H02M 7/537; H02M 7/5387; H02M 7/53871; H02M 1/0006; H02M 1/0067; H02M 1/007; H02M 1/08; H02M 1/084; H02M 1/32; H02M 1/36; H02M 3/00; H02M 3/02; H02M 3/04; H02M 3/137; H02M 3/155; H02M 3/1552; H02M 3/156; H02M 3/158; H02M 3/1588; H02M 3/22; H02M 3/24; H02M 3/315; H02M 3/335; H02M 3/33523; H02M 3/33553; H02M 3/33569; H02M 3/33571; H02M 3/33573; H02M 3/33576; H02M 3/33592; Y02E 10/56
USPC ......... 323/271–275, 282–286, 288.289, 304, 323/311, 312, 351, 906, 908, 288, 289; 363/15–17, 19, 20, 21.01–21.3, 37, 40, 363/44, 65, 123, 125–127, 131–134
See application file for complete search history.

(56) References Cited

U.S. PATENT DOCUMENTS

| | | |
|---|---|---|
| 2015/0049525 A1 | 2/2015 | Mu |
| 2017/0093299 A1 | 3/2017 | Norimatsu et al. |
| 2017/0288556 A1 | 10/2017 | Tang et al. |
| 2017/0320157 A1 | 11/2017 | Zhang |
| 2019/0229627 A1 | 7/2019 | Hande et al. |
| 2022/0068100 A1* | 3/2022 | Xu .................. H02M 7/155 |

FOREIGN PATENT DOCUMENTS

| | | |
|---|---|---|
| CN | 103151906 A | 6/2013 |
| CN | 103219890 A | 7/2013 |
| CN | 203522317 U | 4/2014 |
| CN | 104659803 A | 5/2015 |
| CN | 204794131 U | 11/2015 |
| CN | 107453630 A | 12/2017 |
| CN | 107508484 A | 12/2017 |
| CN | 108768179 A | 11/2018 |
| CN | 112600455 A | 4/2021 |
| DE | 19641299 C2 | 8/2000 |
| DE | 102017106504 A1 | 10/2017 |
| EP | 3058648 B1 | 3/2019 |
| JP | S63213471 A | 9/1988 |

OTHER PUBLICATIONS

International Search Report for PCT/CN2021/136053 mailed Feb. 23, 2022, ISA/CN.

European Search Report issued on Oct. 4, 2024 for the European counterpart application No. 21902595.4.

Muhammad H. Rashid: "Power Electronics Handbook"IN In:"Power electronics handbook : devices, circuits, and applications" , (Jan. 13, 2011) , Elsevier/BH, Butterworth-Heinemann, Amsterdam, XP055352565, ISBN:978-0-12-382036-5, pp. 551-552,.

* cited by examiner

POWER SUPPLY SYSTEM AND SOLAR PHOTOVOLTAIC INVERTER

CROSS REFERENCE OF RELATED APPLICATION

This application is the national phase of International Application No. PCT/CN2021/136053, titled "POWER SUPPLY SYSTEM AND SOLAR PHOTOVOLTAIC INVERTER", filed on Dec. 7, 2021, which claims priority to Chinese Patent Application No. 202011419207.4, titled "POWER SUPPLY SYSTEM AND SOLAR PHOTOVOLTAIC INVERTER", filed on Dec. 7, 2020 with the China National Intellectual Property Administration (CNIPA), both of which are incorporated herein by reference in their entireties.

FIELD

The present disclosure relates to the field of photovoltaics, and in particular, to a power supply system and a solar photovoltaic inverter.

BACKGROUND

Reference is made to FIG. 1, which is a schematic diagram of a solar photovoltaic inverter in conventional technology provided in the present disclosure. Specifically, an output terminal of a solar panel is connected to a direct current (DC) conversion switching module, a main transformer and a first rectification module in sequence to boost a DC outputted from the solar panel to achieve an inverter input voltage of an inverter module. Specifically, the DC conversion switching module is used to boost and convert a DC at an input terminal of the DC conversion switching module into a high-frequency alternating current (AC), the main transformer is used to boost the high-frequency AC and perform high-voltage isolation, and the first rectification module is used to rectify an AC outputted from the transformer into a DC. The DC conversion switching module needs to be driven by a DC driving module, the first rectification module needs to be driven by a rectification driving module, the inverter module needs to be driven by an inverter driving module, and all the driving modules need to be powered. For other circuits (such as a communication module and a display circuit or the like in the solar photovoltaic inverter), a circuit on a primary side of the main transformer is used as a DC side circuit, and a circuit on a secondary side of the main transformer is used as an AC side circuit, that is, both the DC side circuit and the AC side circuit also need to be powered. In conventional technology, an auxiliary power supply is used to supply power to them. Specifically, the auxiliary power supply includes a switching circuit, a transformer, a second rectification module, and a third rectification module. An input terminal of the switching circuit is connected to the output terminal of the solar panel, and the switching circuit is used to convert a DC power supply outputted by the solar panel into an AC power supply. The transformer is used to perform high-voltage isolation and adjust a voltage of the AC power supply outputted by the switching circuit through a coil. Furthermore, the DC driving module and other DC side circuits are supplied power by the second rectification module, and the rectification driving module, the AC driving module and other AC side circuits are supplied power by the third rectification module supplies power. During the power supply process, since a switch in the switching circuit needs to be turned on or off frequently, resulting in high power consumption and easy noise generation. In addition, the cost of the transformer is relatively high.

SUMMARY

The purpose of the present disclosure is to provide a power supply system and a solar photovoltaic inverter, which do not require an additional auxiliary power supply arranged for high-voltage isolation, that is, do not require to additionally arrange a switching circuit, a transformer, a second rectification module and a third rectification module. In the present disclosure, the noises and power consumption caused by frequently turning on or off of the switching circuit can be avoided. In addition, the cost is reduced as there is no need to use additional transformer for high-voltage isolation.

In order to solve the above technical problems, a power supply system is provided according to the present disclosure. The power supply system is applied to a solar photovoltaic inverter, the solar photovoltaic inverter include a direct current (DC) conversion switching module, a main transformer, a rectification module, and an inverter module connected in sequence, and the solar photovoltaic inverter further includes a DC driving module, a rectification driving module, and an inverter driving module. The power supply system includes:

a DC/DC module, configured to adjust a voltage of a DC outputted from a solar panel to supply power to the DC driving module and a DC side circuit, where an input terminal of the DC/DC module is connected to an output terminal of the solar panel, and an output terminal of the DC/DC module is connected to the DC driving module; and a rectification module, configured to rectify an alternating current (AC) outputted from the main transformer to supply power to the rectification driving module, the inverter driving module and an AC side circuit, where an input terminal of the rectification module is connected to an output terminal of the main transformer, and an output terminal of the rectification module is connected to the inverter driving module.

Optionally, the power supply system further includes:

a voltage dividing module, configured to step down the AC outputted from the main transformer, where the voltage dividing module is arranged between the main transformer and the rectification module.

Optionally, the power supply system further includes:

an energy storage module, connected to the rectification module and the inverter driving module, respectively, where the energy storage module is configured to: supply power to the inverter driving module, the rectification driving module and the AC side circuit when the output terminal of the rectification module stops outputting power;

where the rectification module is further configured to rectify the AC outputted from the main transformer to charge the energy storage module.

Optionally, the inverter module is a bridge inverter circuit;

where the inverter driving module includes:

an upper diode driving module, configured to drive an upper bridge arm of the bridge inverter circuit, where an input terminal of the upper diode driving module is connected to the output terminal of the rectification module, and an input terminal of the upper diode driving module is connected to the upper bridge arm of the bridge inverter circuit; and a lower diode driving module, configured to drive a lower bridge arm of the bridge inverter circuit, where an input terminal of the lower diode driving module is connected to the output terminal of the rectification module, and an input terminal of the lower diode driving module is connected to the lower bridge arm of the bridge inverter circuit; and where the inverter driving module further includes:

a bootstrap circuit, configured to boost power from the output terminal of the rectification module to supply power to the upper diode driving module, where the bootstrap circuit is arranged between the rectification module and the upper diode driving module.

Optionally, the bootstrap circuit includes a diode, a first capacitor and a regulator;

where an anode of the diode is connected to the output terminal of the rectification module, and a cathode of the diode is connected to one terminal of the first capacitor, one terminal of the regulator and the input terminal of the upper diode driving module respectively, and another terminal of the first capacitor is connected to another terminal of the regulator, a ground terminal of the upper diode driving module and a connection point of the upper bridge arm and the lower bridge arm in the bridge inverter circuit respectively.

Optionally, the number of the upper bridge arm in the bridge inverter circuit is M, the number of the lower bridge arm in the bridge inverter circuit is M, and M is greater than or equal to 2;

where the number of the upper diode driving module is M, and the M upper diode driving modules correspond to the M upper bridge arms one by one;

where the number of the lower diode driving module is M, and the M lower diode driving modules correspond to the M lower bridge arms one by one; and where the number of the bootstrap circuit is M, and the M bootstrap circuits correspond to the M upper diode driving modules one by one.

Optionally, the energy storage module includes a second capacitor, and the energy storage module further includes a first resistor, a second resistor, a third resistor, a fourth resistor, and a Zener diode;

where a first terminal of the first resistor is connected to the output terminal of the rectification module, a second terminal of the first resistor is connected to a first terminal of the Zener diode, a second terminal of the Zener diode is connected to one terminal of the second capacitor, a first terminal of the third resistor and a first terminal of the fourth resistor respectively, a third terminal of the Zener diode is connected to a second terminal of the third resistor and a first terminal of the second resistor, and the first terminal of the second resistor is connected to another terminal of the second capacitor and a second terminal of the fourth resistor respectively.

Optionally, the number of the DC conversion switching module is N, the number of the main transformer is N, and N is greater than or equal to 2;

where the power supply system further includes:

N voltage dividing modules, the N voltage dividing modules correspond to the N main transformers one by one, input terminals of the N voltage dividing modules are connected to output terminals of corresponding main transformers respectively, and output terminals of the N voltage dividing modules are connected in parallel and connected to the input terminal of the rectification module; and the rectification module is specifically configured to rectify AC outputted from the N voltage dividing modules.

Optionally, the power supply system further includes:

N current limiting modules, configured to limit charging current of the energy storage module, where the N current limiting modules are connected to the output terminals of the N voltage dividing modules one by one correspondingly.

In order to solve the above technical problems, a solar photovoltaic inverter is provided according to the present disclosure. The solar photovoltaic inverter includes the above power supply system. The solar photovoltaic inverter further includes a DC conversion switching module, a main transformer, an inverter module connected in sequence, and a DC driving module, a rectification driving module and inverter driving module;

where the DC conversion switching module is configured to boost and convert DC from the output terminal of the solar panel into high-frequency AC;

where the main transformer is configured to perform high-voltage isolation and boost the high-frequency AC;

where the rectification module is configured to rectify AC outputted from the main transformer into DC;

where the inverter module is configured to invert an output of the rectification module to supply power for the load;

where the DC driving module is configured to drive the DC conversion switching module;

where the rectification driving module is configured to drive the rectification module; and where the inverter driving module is configured to drive the inverter module.

A power supply system is provided according to the present disclosure. The power supply system includes a DC/DC module and a rectification module. The DC/DC module is configured to adjust a voltage of a DC outputted from a solar panel to supply power to a DC driving module and a DC side circuit, and the rectification module is configured to rectify an AC outputted from a main transformer to supply power to a rectification driving module, a inverter driving module and an AC side circuit. Since the power outputted from the solar panel in the present disclosure is low-voltage power, the power supply at the output terminal of the solar panel can directly supply power to the DC driving module and the DC side circuit by adjusting voltage. Since the power outputted from the main transformer is high-voltage power, the AC outputted from the main transformer can directly supply power to the rectification driving module, the inverter driving module and the AC side circuit through the rectification module. Thus, no additional auxiliary power supply is required for high-voltage isolation. That is, there is no need to additionally configure a switching circuit, a transformer, a second rectification module and a third rectification module. Therefore, the noises and power consumption caused by frequently turning on or off of the switching circuit can be avoided. In addition, the cost is reduced as there is no need to use additional transformer for high-voltage isolation.

A solar photovoltaic inverter is also provided according to the present disclosure, which has the same beneficial effects as the power supply system described above.

BRIEF DESCRIPTION OF THE DRAWINGS

In order to more clearly illustrate the technical solutions in the embodiments of the present disclosure, the accompanying drawings used in the conventional technology and embodiments are briefly introduced hereinafter. It is apparent that the drawings in the following description illustrate merely embodiments of the present disclosure. Other drawings may be obtained by those skilled in the art without creative efforts based on the provided drawings.

DETAILED DESCRIPTION

The core of the present disclosure is to provide a power supply system and a solar photovoltaic inverter, which do not require additional auxiliary power supply for high-voltage isolation, that is, do not require an additional switching circuit, a transformer, a second rectification module and a third rectification module to eliminate the noises and power consumption caused by frequently turning on or off of the switching circuit. In addition, the cost is reduced as there is no need to use additional transformer to isolate high voltage.

In order to make the purpose, technical solutions and advantages of the embodiments of the present disclosure clearer, the technical solutions in the embodiments of the present disclosure will be described clearly and completely hereinafter in combination with the drawings in the embodiments of the present disclosure. It is apparent that the described embodiments are a part of the embodiments of the present disclosure, rather than all the embodiments. Based on the embodiments of the present disclosure, all other embodiments obtained by those skilled in the art without creative efforts pertain to the protection scope of the present disclosure.

Figure 1:
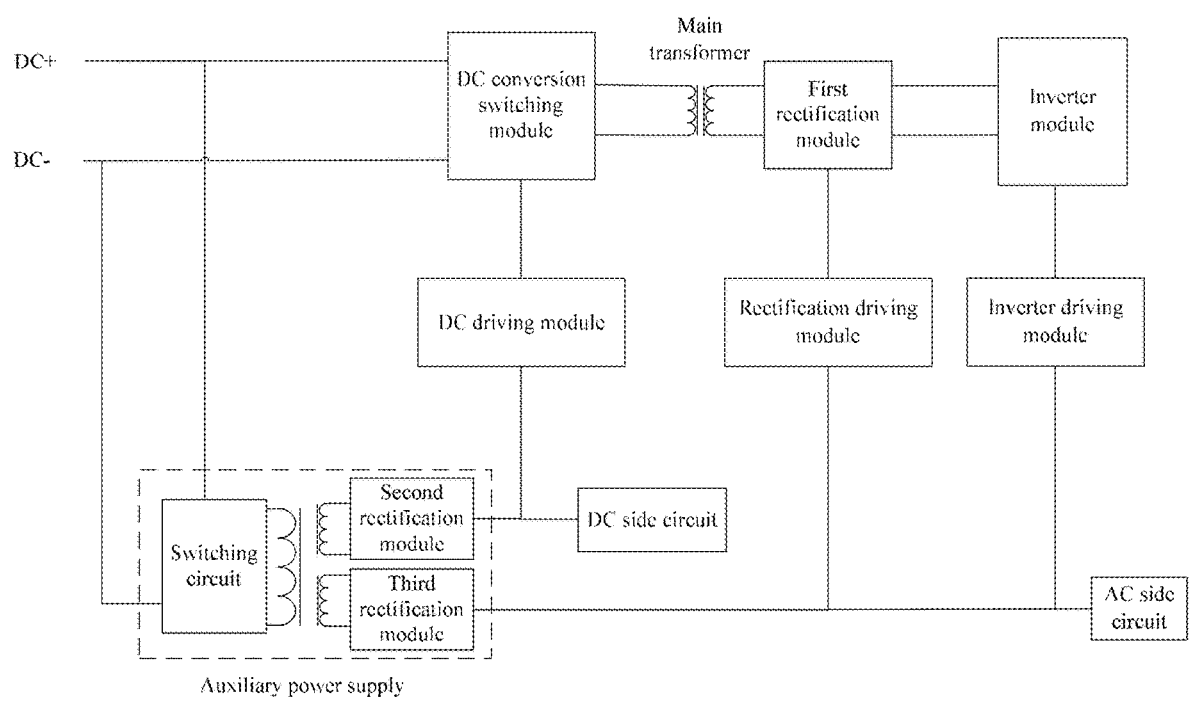
FIG. 1 is a schematic diagram of a solar photovoltaic inverter in conventional technology provided according to the present disclosure.
Figure 2:
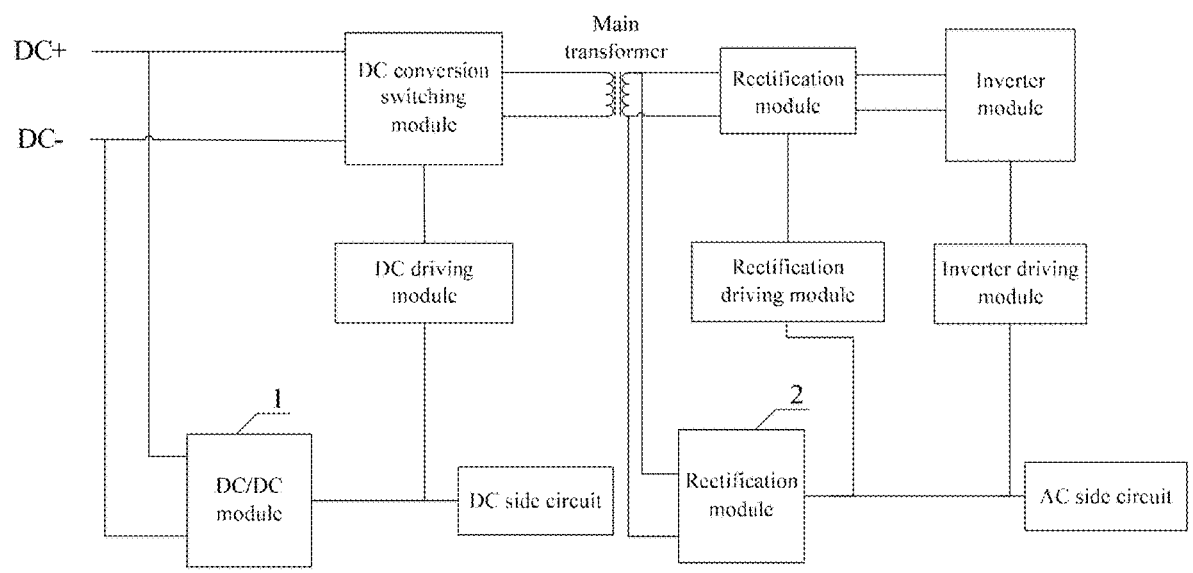
FIG. 2 is a structural block diagram of a power supply system provided according to the present disclosure.

Reference is made to FIG. 2, which is a structural block diagram of a power supply system provided according to the present disclosure. The system is applied to a solar photovoltaic inverter, and the solar photovoltaic inverter includes a direct current (DC) conversion switching module, a main transformer, a rectification module, and an inverter module connected in sequence. The solar photovoltaic inverter further includes a DC driving module, a rectification driving module, and an inverter driving module. The system includes a DC/DC module 1 and a rectification module 2.

The DC/DC (DC-DC converter) module 1 is configured to adjust a voltage of a DC outputted from a solar panel to supply power to the DC driving module and a DC side circuit. An input terminal of the DC/DC module 1 is connected to an output terminal of the solar panel, and an output terminal of the DC/DC module 1 is connected to the DC/DC driving module.

The rectification module 2 is configured to rectify an alternating current (AC) outputted from the main transformer to supply power to the inverter driving module and an AC side circuit. An input terminal of the rectification module 2 is connected to an output terminal of the main transformer, and an output terminal of the rectification module 2 is connected to the inverter driving module.

The solar photovoltaic inverter includes a DC conversion switching module, a main transformer, a rectification module and an inverter module connected in sequence. The DC conversion switching module is a high-frequency switch that boosts the DC outputted from the solar panel. The main transformer is used for high-voltage isolation and boosting. The rectification module rectifies the AC outputted from the main transformer into DC. The inverter module inverts the output of the rectification module to supply power for the load. The DC driving module is used to drive the DC conversion switching module. The rectification driving module is used to drive the rectification module. The inverter driving module is used to drive the inverter module, and the driving modules, the DC side circuit and the AC side circuit are all need power supply. In conventional technology, an auxiliary power supply is used to supply power. Specifically, the auxiliary power supply includes a switching circuit, a transformer, a second rectification module and a third rectification module. During the power supply process, the switches in the switching circuit need to be turned on or off frequently, which consumes a lot of power and generates noises easily. In addition, the cost of the transformer is relatively high.

In order to solve the above technical problems, the design idea of the present disclosure is as follows. Given that the power outputted from the solar panel is lower-voltage power, generally 20 to 60V, and the power at the output terminal of the main transformer is high-voltage power, generally 300 to 400V, then the low-voltage power outputted from the solar panel may be adjusted to supply power to the DC driving module, and the high-voltage power at the output terminal of the main transformer may be processed to supply power to the inverter driving module. Therefore, there is no need to isolate the power supply modules. In other words, there is no need to additionally configure an auxiliary power supply including a switching circuit, a transformer, a second rectification module and a third rectification module.

In view of this, the DC/DC module 1 is configured according to the present disclosure, which adjusts the voltage of the low-voltage DC outputted from the solar panel to supply power to the DC driving module and the DC side circuit, where the DC side circuit is the circuit required to be supplied DC power at the primary side of the main transformer. The rectification module 2 is also configured to rectify the AC at the output terminal of the main transformer to supply power to the inverter driving module, the rectification driving module and the AC side circuit, where the AC side circuit is the circuit required to be supplied AC power at the secondary side of the main transformer.

It should be noted that, since the power outputted from the main transformer herein is high-voltage AC, the rectification module 2 may be a rectification module 2 that can implement both rectification and step-down functions.

Figure 3:
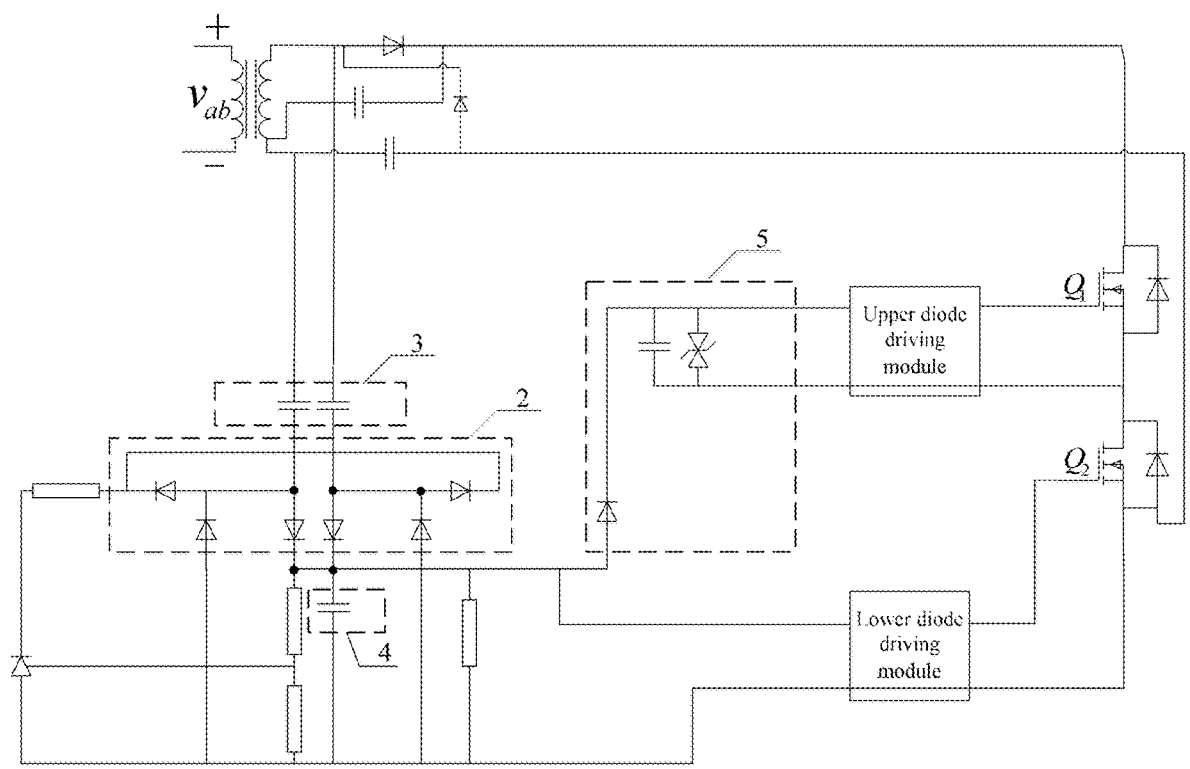
FIG. 3 is a schematic diagram of a partial circuit connection of a first power supply system provided according to the present disclosure.

In addition, in a case that the rectification module includes Metal-Oxide-Semiconductor Field-Effect Transistor (MOS) transistors in the present disclosure, it needs to be driven by a rectification driving module. In this case, it is necessary for the power outputted from the rectification module to supply power to the rectification driving module. In contrast, in a case that the rectification module includes diodes instead of MOS transistors, the rectification driving module may not be required. Reference is made to FIG. 3, which is a schematic diagram of a circuit connection of a first power supply system in partial provided according to the present disclosure. The rectification module here may include a first diode, a second diode, a third capacitor and a fourth capacitor. Specifically, the anode of the first diode is respectively connected to the positive output terminal of the main transformer and the cathode of the second diode, the cathode of the first diode is connected to the first terminal of the third capacitor, the second terminal of the third capacitor is respectively connected to the first terminal of the fourth capacitor and the negative output terminal of the main transformer, and the anode of the second diode is connected to the second terminal of the fourth capacitor. In this case, the rectification module does not need the rectification driving module, therefore the power outputted from the rectification module does not need to supply power to the rectification driving module.

In conclusion, since the power outputted from the solar panel in the present disclosure is low-voltage power, the power at the output terminal of the solar panel can directly supply power to the DC driving module and the DC side circuit through adjusting the voltage. Since the power outputted from the main transformer is high-voltage power, the AC outputted from the main transformer can directly supply power to the inverter driving module, the rectification driving module and the AC side circuit through the rectification module 2. Therefore, no additional auxiliary power supply is required for high-voltage isolation, that is, there is no need to additionally configure the switching circuit, the transformer, the second rectification module and the third rectification module, thereby avoiding the noises and power consumption caused by turning on or off of the switching circuit frequently. As no additional transformer is used for high-voltage isolation, the cost is reduced.

Figure 4:
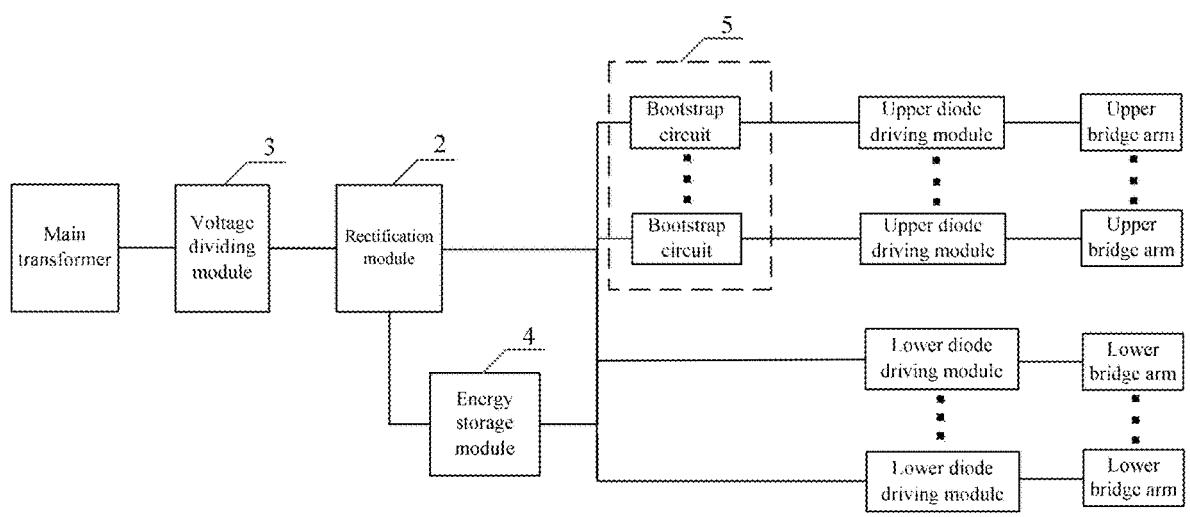
FIG. 4 is a partial structural block diagram of the first power supply system provided according to the present disclosure.

On the basis of above-mentioned embodiments, reference is made to FIG. 4, which is a partial structural block diagram of the first power supply system provided according to the present disclosure.

As a preferred embodiment, it may further include a voltage dividing module 3, which is configured to step down the AC outputted from the main transformer, where the voltage dividing module 3 is arranged between the main transformer and the rectification module 2.

Given that the AC voltage at the output terminal of the main transformer in the solar photovoltaic inverter is high voltage, a voltage dividing module 3 may be provided in the rectification module 2, which is used to step down the AC outputted from the main transformer. The rectification module 2 may be damaged in a case that some rectification modules 2 are not be provided with the voltage dividing module 3.

In order to solve the above technical problems, a voltage dividing module 3 is arranged between the rectification module 2 and the main transformer according to the present disclosure, which is used to step down the high-voltage AC outputted from the main transformer.

Specifically, according to the present disclosure, the voltage dividing module 3 may include two capacitors, one terminals of the two capacitors are respectively connected to the positive input terminal and the negative input terminal of the main transformer, and another terminals of the two capacitors are respectively connected to the input terminal of the rectification module 2, which is used to share the output voltage of the main transformer with the energy storage module 4 to limit the charging voltage of the energy storage module 4 and prevent the energy storage module 4 from being damaged.

It can be seen that, the voltage dividing module 3 is arranged between the main transformer and the rectification module 2 according to the present disclosure, which can implement the function of stepping down the AC at the output terminal of the main transformer, thereby ensuring the safety and reliability of the system and preventing the energy storage module 4 from being damaged.

As a preferred embodiment, it may further include an energy storage module 4, which is configured to supply power to the inverter driving module, the rectification driving module and the AC side circuit in a case that the output terminal of the rectification module 2 stops outputting power supply, where the energy storage module 4 is respectively connected to the rectification module 2 and the inverter driving module.

The rectification module 2 is further configured to rectify the AC outputted from the main transformer to charge the energy storage module 4.

Given that there may be condition that the output terminal of the rectification module 2 stops outputting power so as to fail to supply power for the inverter driving module, the rectification driving module and the AC side circuit or other conditions that the power supply at the output terminal of rectification module 2 is unstable (such as the rectification module 2 is damaged or the like) while the output terminal of the rectification module 2 is directly supplying power to the inverter driving module, the rectification driving module and the AC side circuit, such conditions will affect the inversion efficiency of the inverter module.

In order to solve the above-mentioned technical problems, the energy storage module 4 is further provided according to the present disclosure, which is connected to the output terminal of the rectification module 2 and the inverter driving module respectively. In this way, in a case that the power outputted from the output terminal of the rectification module 2 can directly supply power to the inverter driving module, the rectification driving module and the AC side circuit, the rectification module 2 not only supplies power to the inverter driving module, the rectification driving module and the AC side circuit, but also charges the energy storage module 4; in a case that it cannot directly supply power to the inverter driving module, the rectification driving module and the AC side circuit for the reason that there is no power outputted from the output terminal of the rectification module 2 or the outputted power is unstable, the energy storage module 4 supplies power to the inverter driving module, the rectification driving module and the AC side circuit. Therefore, it is ensured that the inverter driving module, the rectification driving module and the AC side circuit can still operate normally even if the output terminal of the rectification module 2 is unable to output the power, ensuring the efficiency of the inverter module.

It should be noted that the energy storage module 4 may be a capacitor according to the present disclosure. Specifically, in a case that the energy storage module 4 is a capacitor, the two terminals of the energy storage module 4 are connected between the output terminal of the rectification module 2 and the inverter driving module in parallel. In addition, the energy storage module 4 is not limited to a capacitor in the present disclosure, and may also be a battery or other energy storage modules 4 with an energy storage function, which is not specifically limited herein.

As a preferred embodiment, the inverter module is a bridge inverter circuit.

The inverter driving module may include an upper diode driving module and a lower diode driving module.

The upper diode driving module is configured to drive an upper bridge arm of the bridge inverter circuit, where an input terminal of the upper diode driving module is connected to the output terminal of the rectification module 2, and an output terminal of the upper diode driving module is connected to the upper bridge arm of the bridge inverter circuit.

The lower diode driving module is configured to drive a lower bridge arm of the bridge inverter circuit, where an input terminal of the lower diode driving module is connected to the output terminal of the rectification module 2, and an output terminal of the lower diode driving module is connected to the lower bridge arm of the bridge inverter circuit.

The inverter driving module further includes a bootstrap circuit 5, which is configured to boost power from the output terminal of the rectification module 2 to supply power to the upper diode driving module. The bootstrap circuit is arranged between the rectification module 2 and the upper diode driving module.

In a case that the inverter module is the bridge inverter circuit, the ground terminal of the lower bridge arm of the bridge inverter circuit is a stable ground terminal, and for the upper bridge arm of the bridge inverter circuit, as the switching on or off of the lower bridge arm, the ground terminal of the upper bridge arm is an unstable ground terminal.

In view of this, referring to FIG. 3, when the inverter module is the bridge inverter circuit according to the present disclosure, the inverter driving module may include an upper diode driving module and a lower diode driving module to drive the upper bridge arm and lower bridge arm of the bridge inverter circuit respectively according to the present disclosure. In this case, the upper diode driving module and the upper bridge arm share the same ground, that is, the ground terminal of the upper diode driving module is also an unstable ground terminal. In order to solve the above-mentioned technical problem, a bootstrap circuit 5 is arranged before the upper diode driving module, which boosts the power of the output terminal of the rectification module 2 to supply power to the upper diode driving module, and the power of the output terminal of the rectification module 2 directly supplies lower diode driving module, so that the power supply terminal of the upper diode driving module is a stable power supply terminal.

In conclusion, in a case that the inverter module is a bridge inverter circuit, using the bootstrap circuit 5 can increase the voltage of the input terminal of the upper diode driving module, thereby ensuring the reliability of the power supply of the upper diode driving module and the reliability of the inverter circuit operation.

As a preferred embodiment, the bootstrap circuit 5 may include a diode, a first capacitor and a regulator. An anode of the diode is connected to the output terminal of the rectification module 2, and a cathode of the diode is connected to one terminal of the first capacitor, one terminal of the regulator and the input terminal of the upper diode driving module respectively. Another terminal of the first capacitor is connected to another terminal of the regulator, a ground terminal of the upper diode driving module and a connection point of the upper bridge arm and the lower bridge arm in the bridge inverter circuit respectively.

The purpose of this embodiment is to provide a specific implementation of the bootstrap circuit 5. Referring to FIG. 4, specifically, the bootstrap circuit 5 includes a diode, a first capacitor, and a regulator. The bootstrap circuit 5 utilizes the characteristic that capacitor does not change in a sudden, the rectification module 2 charges the first capacitor through the diode. After the first capacitor is charged, the positive output terminal of the upper diode driving module is always maintained at the voltage after the first capacitor has been charged, thus ensuring that the upper diode driving module can accurately drive the upper bridge arm of the bridge inverter circuit to ensure the reliability of the power supply terminal of the inverter driving module.

Specifically, according to the present disclosure, the bridge inverter circuit may be a half-bridge inverter circuit, a full-bridge inverter circuit or other bridge inverter circuits, as long as the high-voltage direct current outputted from the rectification module in the present disclosure can be inverted, which is not specifically limited in the present disclosure.

In addition, according to the present disclosure, the upper bridge arm and the lower bridge arm of the bridge inverter circuit may be transistors or MOS transistors, or other controllable switches. Taking the upper bridge arm including a first controllable switch and a third diode and the lower bridge arm including a second controllable switch and a fourth diode as an example, the first terminal of the first controllable switch is connected to the positive output terminal of the rectification module and the cathode of the third diode, the second terminal of the first controllable switch is respectively connected to the first terminal of the second controllable switch, the anode of the third diode and the cathode of the fourth diode, and the control terminal of the first controllable switch is connected to the output terminal of the upper diode driving module, the second terminal of the second controllable switch is respectively connected to the anode of the fourth diode and the negative output terminal (that is, the ground terminal) of the rectification module, the control terminal of the second controllable switch is connected to the output terminal of the lower diode driving module. Wherein, both the first controllable switch and the second controllable switch may be, but not limited to, positive channel Metal Oxide Semiconductor (PMOS) transistors.

As a preferred embodiment, both the number of upper bridge arms and the lower bridge arms of the bridge inverter circuit are M, and M is no less than 2. The number of the upper diode driving module is M, and the M upper diode driving modules correspond to the M upper bridge arms one by one. The number of the lower diode driving module is M, and the M lower diode driving modules correspond to the M lower bridge arms one by one. The number of the bootstrap circuit 5 is M, and the M bootstrap circuits correspond to the M upper diode driving modules one by one.

Figure 5:
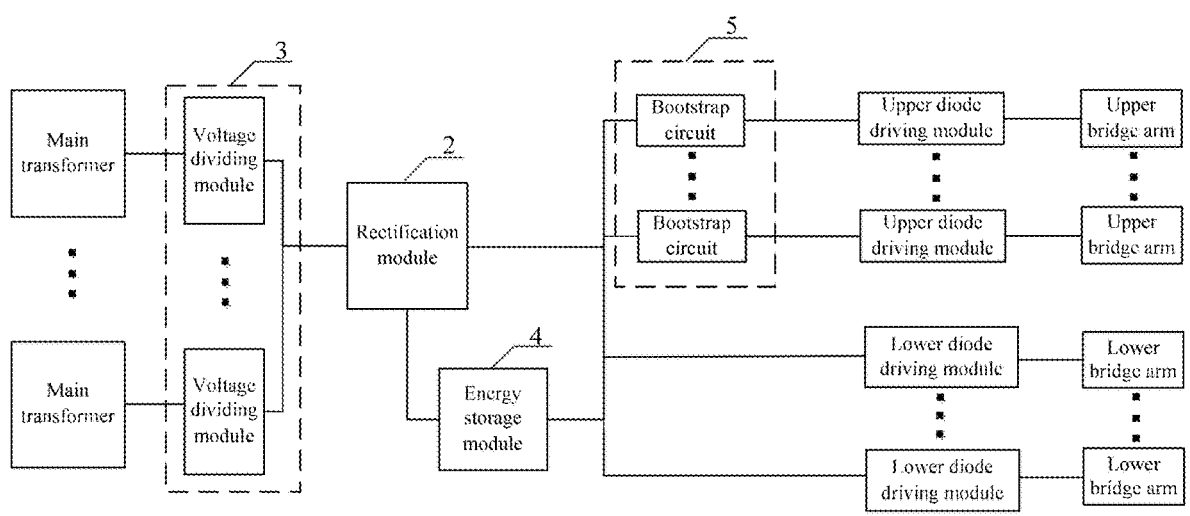
FIG. 5 is a partial structural block diagram of a second power supply system provided according to the present disclosure.

Given that the bridge inverter circuit may not be a half-bridge inverter circuit, that is, when the bridge inverter circuit has multiple (M) bridge arms, referring to FIG. 5, FIG. 5 is a partial structural block diagram of a second power supply system provided according to the present disclosure. In this case, M upper diode driving modules are required to drive M upper bridge arms respectively, and M lower diode driving modules are required to drive M lower bridge arms respectively. In this case, for the ground terminals of the upper bridge arms of the M bridge inverter circuits, the ground terminals of the M upper bridge arms are all unstable ground terminals due to the switching on or off of the lower bridge arms, and the upper diode driving module and the upper bridge arms share the same ground.

In view of this, according to the present disclosure, M bootstrap circuits 5 is further configured to supply power to M upper diode driving modules respectively to ensure the reliability of the power supply terminal of the upper diode driving module, thereby ensuring the reliability of the upper bridge arm driven by the upper diode driving module.

As a preferred embodiment, the energy storage module 4 is a second capacitor, and the energy storage module may further include a first resistor, a second resistor, a third resistor, a fourth resistor, and a Zener diode. A first terminal of the first resistor is connected to the output terminal of the rectification module 2. A second terminal of the first resistor is connected to a first terminal of the Zener diode. A second terminal of the Zener diode is connected to one terminal of the second capacitor, a first terminal of the third resistor and a first terminal of the fourth resistor respectively. A third terminal of the Zener diode is connected to a second terminal of the third resistor and a first terminal of the second resistor. A second terminal of the second resistor is connected to another terminal of the second capacitor and a second terminal of the fourth resistor respectively.

When the energy storage module 4 is the second capacitor, the energy storage module 4 is connected in parallel to the output terminal of the energy storage module 4. That is, one terminal of the first capacitor is connected to the output terminal of the energy storage module 4, and the other terminal of the energy storage module 4 is grounded. In this case, it may further include a first resistor, a second resistor, a third resistor, a fourth resistor and a Zener diode. The first resistor is a current limiting resistor for preventing the Zener diode from overcurrent. The second resistor and the fourth resistor are the reference voltage divider resistors, which are used to divide the voltage across the second capacitor. The Zener diode is a voltage limiting device, which is used to limit the voltage of the third resistor to ensure the safety and reliability of the circuit. The fourth resistor is an equivalent load, which may directly drive other chips in the system, and may also be connected to the bootstrap circuit 5 to supply power to the upper diode driving module.

In sum, functions such as current limiting and voltage limiting can be realized through the first resistor, the second resistor, the third resistor, the fourth resistor and the Zener diode in the present disclosure, ensuring the stability, reliability and safety of the operation in the system.

As a preferred embodiment, both the number of the direct current conversion switching modules and the main transformers are N, and N is no less than 2. The power supply system further includes N voltage dividing modules 3. The N voltage dividing modules correspond to the N main transformers one by one, input terminals of the N voltage dividing modules 3 are connected to output terminals of corresponding main transformers respectively, and output terminals of the N voltage dividing modules 3 are connected in parallel and connected to the input terminal of the rectification module 2.

The rectification module 2 is configured to rectify AC outputted from the N voltage dividing modules 3.

Figure 6:
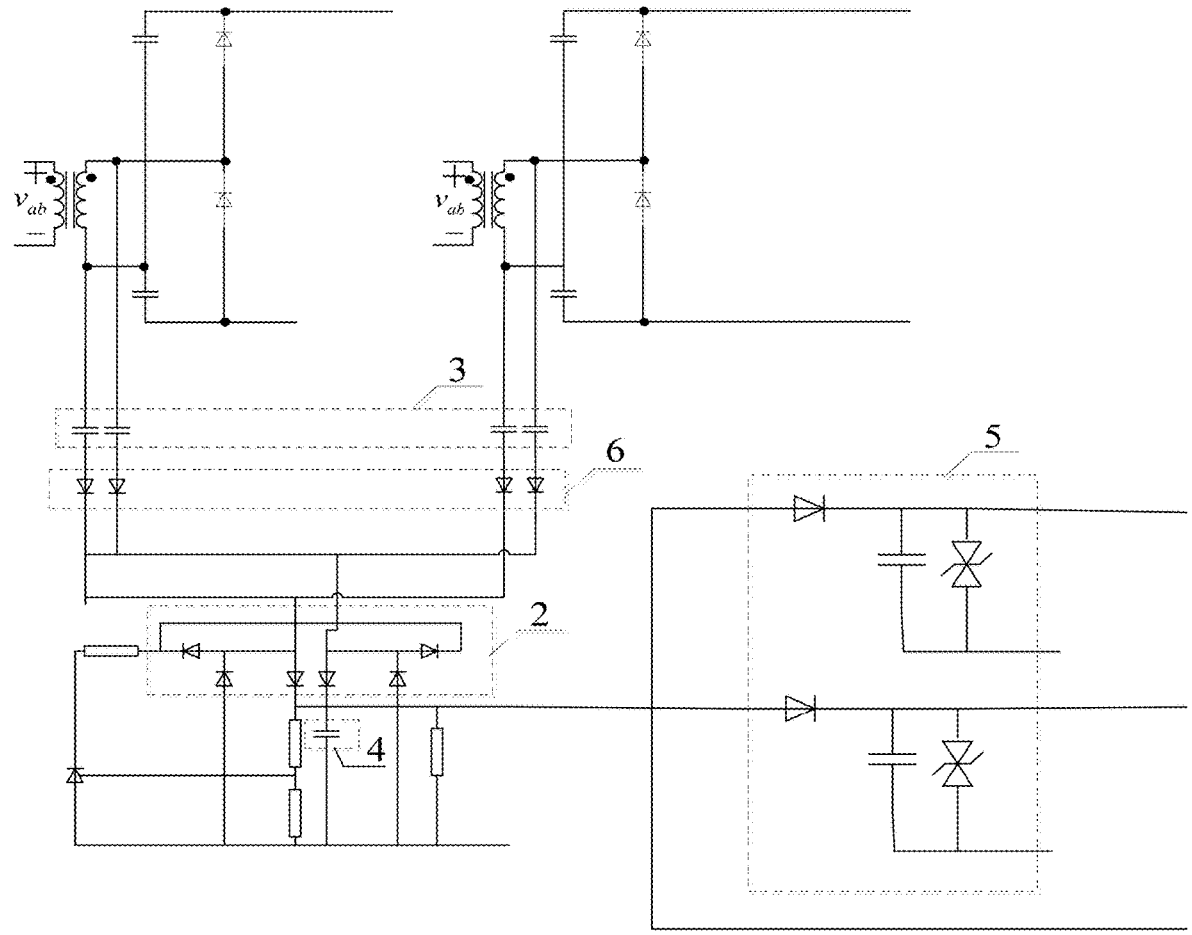
FIG. 6 is a schematic diagram of a partial circuit connection of the second power supply system provided according to the present disclosure.

In view of the main transformer and the direct current conversion switching modules at the front end of the main transformer are multiple (N), where the AC outputted from the N main transformers is stepped down and then is uniformly rectified through the rectification module 2. Reference is made to FIG. 6, which is a schematic diagram of a circuit connection of the second power supply system in partial provided according to the present disclosure, where the number of main transformers is two, and the number of the rectification module 2 is one. In this case, the AC outputted from each voltage dividing module 3 is rectified by one rectification module 2. Since there is no need to configure multiple rectification modules 2, it saves device costs and wiring costs.

Figure 7:
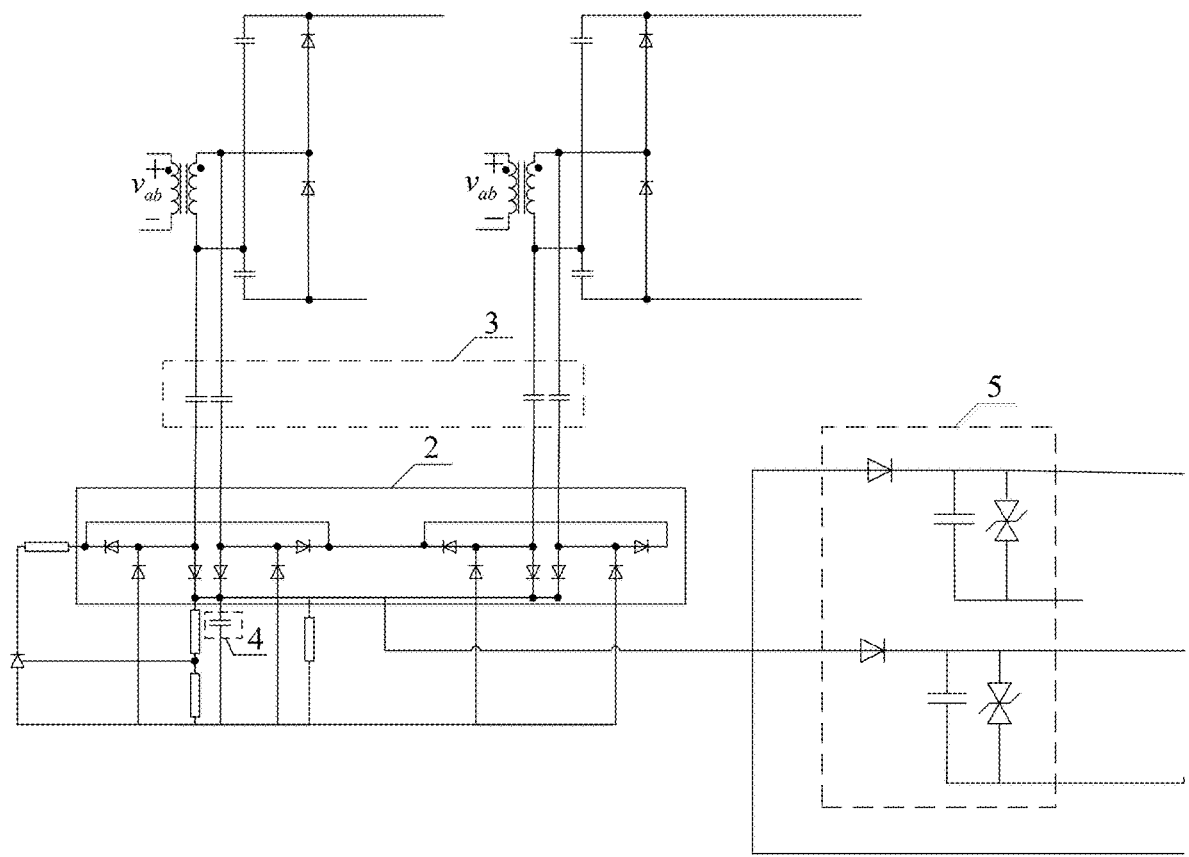
FIG. 7 is a schematic diagram of a partial circuit connection of a third power supply system provided according to the present disclosure.

Obviously, the rectification module 2 in the present disclosure may also rectify the AC outputted from the corresponding voltage dividing module 3 through the respective rectification modules 2. Reference is made to FIG. 7, which is a schematic diagram of a partial circuit connection of a third power supply system provided according to the present disclosure. The number of main transformers is two, and the number of rectification modules 2 is two. When two rectification modules 2 are used for rectification, the rectification efficiency is improved.

As a preferred embodiment, it may further include N current limiting modules 6, which is configured to limit charging current of the energy storage module 4, where the N current limiting modules 6 are correspondingly connected to the output terminals of the N voltage dividing modules 3.

In view of the limited energy storage capacity of the energy storage module 4, in order to prevent the energy storage module 4 from being damaged, N current limiting modules 6 are respectively configured at the output terminals of the N voltage divider modules 3 to limit the charging current of the energy storage module 4, so as to prevent the energy storage module 4 from being damaged.

The current limiting module 6 in the present disclosure may include multiple diodes, referring to FIG. 6, obviously, the specific implementation of the current limiting module 6 in the present disclosure is not limited to the above examples, and may also be other devices with current limiting function, which is not specifically limited in the present disclosure.

In order to solve the above technical problems, a solar photovoltaic inverter is provided according to the present disclosure, which includes the above-mentioned power supply system, and the solar photovoltaic inverter further includes a DC conversion switching module, a main transformer, a rectification module, an inverter module connected in sequence, and a DC driving module, a rectification driving module and inverter driving module. The DC conversion switching module is configured to boost and convert DC from the output terminal of the solar panel into high-frequency AC. The main transformer is configured to perform high-voltage isolation and boost the high-frequency AC. The rectification module is configured to rectify AC outputted from the main transformer into DC. The inverter module is configured to invert an output of the rectification module to supply power for the load. The DC driving module is configured to drive the DC conversion switching module. The rectification driving module is configured to drive the rectification module. The inverter driving module is configured to drive the inverter module.

In order to solve the above technical problems, a solar photovoltaic inverter is provided according to the present disclosure, which has the same beneficial effects as the power supply system described above, and the present disclosure will not repeat them herein.

Each embodiment in this specification is described in a progressive manner, each embodiment focuses on the difference from other embodiments, and the same and similar parts of each embodiment can be referred to each other. As for the device disclosed in the embodiment, since it corresponds to the method disclosed in the embodiment, the description is relatively simple, and the related information can refer to the description of the method part.

It should further be note that, relational terms such as first and second are used solely to distinguish one entity or operation from another entity or operation without necessarily requiring or implying any actual such relationship or order between such entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Unless expressively limited otherwise, a process, method, article or device limited by "comprising/including a(n) . . . " does not exclude existence of other identical elements in the process, method, article or device.

According to the above description of the disclosed embodiments, those skilled in the art can implement or practice the present disclosure. Many modifications to these embodiments are apparent to those skilled in the art. The general principles defined herein may be applied to other embodiments without departing from the spirit or scope of the present disclosure. Therefore, the present disclosure should not be limited to the embodiments disclosed herein, but has the widest scope in accordance with the principle and the novel features disclosed herein.

The invention claimed is:

1. A power supply system, applied to a solar photovoltaic inverter, the solar photovoltaic inverter comprising a direct current (DC) conversion switching circuit, a main transformer, a first rectification circuit, and an inverter circuit connected in sequence, the solar photovoltaic inverter further comprising a DC driving circuit, a rectification driving circuit, and an inverter driving circuit, wherein the power supply system comprises:
   a DC/DC circuit, configured to adjust a voltage of a DC outputted from a solar panel to supply power to the DC driving circuit and a DC side circuit, wherein an input terminal of the DC/DC circuit is connected to an output terminal of the solar panel, and an output terminal of the DC/DC circuit is connected to the DC driving circuit; and
   a second rectification circuit, configured to rectify an alternating current (AC) outputted from the main transformer to supply power to the rectification driving circuit, the inverter driving circuit and an AC side circuit, wherein an input terminal of the second rectification circuit is connected to an output terminal of the main transformer, and an output terminal of the second rectification circuit is connected to the inverter driving circuit; and
   an energy storage circuit, connected to the second rectification circuit and the inverter driving circuit, respectively, wherein the energy storage circuit is configured to: supply power to the inverter driving circuit, the rectification driving circuit and the AC side circuit when the output terminal of the second rectification circuit stops outputting power;
   wherein the second rectification circuit is further configured to rectify the AC outputted from the main transformer to charge the energy storage circuit.

2. The power supply system according to claim 1, further comprising:
   a voltage dividing circuit, configured to step down the AC outputted from the main transformer, wherein the voltage dividing circuit is arranged between the main transformer and the second rectification circuit.

3. The power supply system according to claim 1, wherein the inverter circuit is a bridge inverter circuit;
   wherein the inverter driving circuit comprises:
   an upper diode driving circuit, configured to drive an upper bridge arm of the bridge inverter circuit, wherein an input terminal of the upper diode driving circuit is connected to the output terminal of the second rectification circuit, and an output terminal of the upper diode driving circuit is connected to the upper bridge arm of the bridge inverter circuit; and
   a lower diode driving circuit, configured to drive a lower bridge arm of the bridge inverter circuit, wherein an input terminal of the lower diode driving circuit is connected to the output terminal of the second rectification circuit, and an output terminal of the lower diode driving circuit is connected to the lower bridge arm of the bridge inverter circuit; and
   wherein the inverter driving circuit further comprises:
   a bootstrap circuit, configured to boost power from the output terminal of the second rectification circuit to supply power to the upper diode driving circuit, wherein the bootstrap circuit is arranged between the second rectification circuit and the upper diode driving circuit.

4. The power supply system according to claim 3, wherein the bootstrap circuit comprises a diode, a first capacitor and a regulator;
   wherein an anode of the diode is connected to the output terminal of the second rectification circuit, and a cathode of the diode is connected to one terminal of the first capacitor, one terminal of the regulator and the input terminal of the upper diode driving circuit respectively, and another terminal of the first capacitor is connected to another terminal of the regulator, a ground terminal of the upper diode driving circuit and a connection point of the upper bridge arm and the lower bridge arm in the bridge inverter circuit respectively.

5. The power supply system according to claim 4, wherein the number of the DC conversion switching circuit is N, the number of the main transformer is N, and N is greater than or equal to 2;
   wherein the power supply system further comprises:
   N voltage dividing circuits, the N voltage dividing circuit correspond to the N main transformers one by one, input terminals of the N voltage dividing circuits are connected to output terminals of corresponding main transformers respectively, and output terminals of the N voltage dividing circuits are connected in parallel and connected to the input terminal of the second rectification circuit; and
   the second rectification circuit is configured to rectify AC outputted from the N voltage dividing circuits.

6. The power supply system according to claim 5, further comprising:
   N current limiting circuits, configured to limit charging current of the energy storage circuit, wherein the N current limiting circuits are connected to the output terminals of the N voltage dividing circuits one by one correspondingly.

7. The power supply system according to claim 3, wherein the number of the upper bridge arm in the bridge inverter circuit is M, the number of the lower bridge arm in the bridge inverter circuit is M, and M is greater than or equal to 2;

wherein the number of the upper diode driving circuit is M, and the M upper diode driving circuits correspond to the M upper bridge arms one by one;

wherein the number of the lower diode driving circuit is M, and the M lower diode driving circuits correspond to the M lower bridge arms one by one; and wherein the number of the bootstrap circuit is M, and the M bootstrap circuits correspond to the M upper diode driving circuits one by one.

8. The power supply system according to claim 7, wherein the number of the DC conversion switching circuit is N, the number of the main transformer is N, and N is greater than or equal to 2;

wherein the power supply system further comprises:

N voltage dividing circuits, the N voltage dividing circuit correspond to the N main transformers one by one, input terminals of the N voltage dividing circuits are connected to output terminals of corresponding main transformers respectively, and output terminals of the N voltage dividing circuits are connected in parallel and connected to the input terminal of the second rectification circuit; and the second rectification circuit is configured to rectify AC outputted from the N voltage dividing circuits.

9. The power supply system according to claim 8, further comprising:

N current limiting circuits, configured to limit charging current of the energy storage circuit, wherein the N current limiting circuits are connected to the output terminals of the N voltage dividing circuits one by one correspondingly.

10. The power supply system according to claim 3, wherein the number of the DC conversion switching circuit is N, the number of the main transformer is N, and N is greater than or equal to 2;

wherein the power supply system further comprises:

N voltage dividing circuits, the N voltage dividing circuit correspond to the N main transformers one by one, input terminals of the N voltage dividing circuits are connected to output terminals of corresponding main transformers respectively, and output terminals of the N voltage dividing circuits are connected in parallel and connected to the input terminal of the second rectification circuit; and the second rectification circuit is configured to rectify AC outputted from the N voltage dividing circuits.

11. The power supply system according to claim 10, further comprising:

N current limiting circuits, configured to limit charging current of the energy storage circuit, wherein the N current limiting circuits are connected to the output terminals of the N voltage dividing circuits one by one correspondingly.

12. The power supply system according to claim 1, wherein the energy storage circuit comprises a second capacitor, and the energy storage circuit further comprises a first resistor, a second resistor, a third resistor, a fourth resistor, and a Zener diode;

wherein a first terminal of the first resistor is connected to the output terminal of the second rectification circuit, a second terminal of the first resistor is connected to a first terminal of the Zener diode, a second terminal of the Zener diode is connected to one terminal of the second capacitor, a first terminal of the third resistor and a first terminal of the fourth resistor respectively, a third terminal of the Zener diode is connected to a second terminal of the third resistor and a first terminal of the second resistor, and the second terminal of the second resistor is connected to another terminal of the second capacitor and a second terminal of the fourth resistor respectively.

13. The power supply system according to claim 12, wherein the number of the DC conversion switching circuit is N, the number of the main transformer is N, and N is greater than or equal to 2;

wherein the power supply system further comprises:

N voltage dividing circuits, the N voltage dividing circuit correspond to the N main transformers one by one, input terminals of the N voltage dividing circuits are connected to output terminals of corresponding main transformers respectively, and output terminals of the N voltage dividing circuits are connected in parallel and connected to the input terminal of the second rectification circuit; and the second rectification circuit is configured to rectify AC outputted from the N voltage dividing circuits.

14. The power supply system according to claim 13, further comprising:

N current limiting circuits, configured to limit charging current of the energy storage circuit, wherein the N current limiting circuits are connected to the output terminals of the N voltage dividing circuits one by one correspondingly.

15. The power supply system according to claim 1, wherein the number of the DC conversion switching circuit is N, the number of the main transformer is N, and N is greater than or equal to 2;

wherein the power supply system further comprises:

N voltage dividing circuits, the N voltage dividing circuit correspond to the N main transformers one by one, input terminals of the N voltage dividing circuits are connected to output terminals of corresponding main transformers respectively, and output terminals of the N voltage dividing circuits are connected in parallel and connected to the input terminal of the second rectification circuit; and the second rectification circuit is configured to rectify AC outputted from the N voltage dividing circuits.

16. The power supply system according to claim 15, further comprising:

N current limiting circuits, configured to limit charging current of the energy storage circuit, wherein the N current limiting circuits are connected to the output terminals of the N voltage dividing circuits one by one correspondingly.

17. A solar photovoltaic inverter, comprising the power supply system according to claim 1, and the solar photovoltaic inverter further comprises a DC conversion switching circuit, a main transformer, a first rectification circuit, an inverter circuit connected in sequence, and a DC driving circuit, a rectification driving circuit and inverter driving circuit;

wherein the DC conversion switching circuit is configured to boost and convert DC from the output terminal of the solar panel into high-frequency AC;

wherein the main transformer is configured to perform high-voltage isolation and boost the high-frequency AC;

wherein the first rectification circuit is configured to rectify AC outputted from the main transformer into DC;

wherein the inverter circuit is configured to invert an output of the first rectification circuit to supply power for a load;

wherein the DC driving circuit is configured to drive the DC conversion switching circuit;
wherein the rectification driving circuit is configured to drive the first rectification circuit; and
wherein the inverter driving circuit is configured to drive the inverter circuit.

\* \* \* \* \*